United States Patent [19]

Bliven et al.

[11] 3,753,634

[45] Aug. 21, 1973

[54] MOLDING MEANS FOR STRIP FRAME SEMICONDUCTIVE DEVICE

[75] Inventors: Thomas G. Bliven, Scottsdale; John R. Hugill, Phoenix, both of Ariz.

[73] Assignee: Motorola, Inc., Franklin Park, Ill.

[22] Filed: Oct. 9, 1970

[21] Appl. No.: 79,601

[52] U.S. Cl. .................................. 425/123, 425/129
[51] Int. Cl. .............................. B29c 1/00, B29f 1/10
[58] Field of Search ..................... 425/116, 121, 123, 425/125, 127, 129; 249/95, 84; 29/627, 588

[56] References Cited

UNITED STATES PATENTS

| | | | |
|---|---|---|---|
| 3,444,441 | 5/1969 | Helda et al. | 29/588 X |
| 2,108,996 | 2/1938 | Sansome | 249/95 X |
| 3,283,224 | 11/1966 | Erkan | 29/588 |
| 3,499,190 | 3/1970 | Ludwig | 425/129 X |
| 3,574,815 | 4/1971 | Segerson | 29/588 X |
| 3,606,673 | 9/1971 | Overman | 29/588 |

FOREIGN PATENTS OR APPLICATIONS

| | | |
|---|---|---|
| 1,048,624 | 7/1951 | Germany |

*Primary Examiner*—J. Spencer Overholser
*Assistant Examiner*—Michael O. Sutton
*Attorney*—Mueller and Aichele

[57] ABSTRACT

In the step of plastic encapsulation of a semiconductive device, the inner ends of a group of leads comprising part of a lead frame, the semiconductive chip and the connections between the chip and the inner ends of the leads, are put into a cavity of a mold and fluid encapsulating material is forced into the cavity to surround the elements that are in the cavity with encapsulating material. A lead frame, which may be supplied in strip form, is provided, a part of which is so formed as to act as a gate for the admission of fluid encapsulating material into the mold cavity.

9 Claims, 3 Drawing Figures

Figure 1:
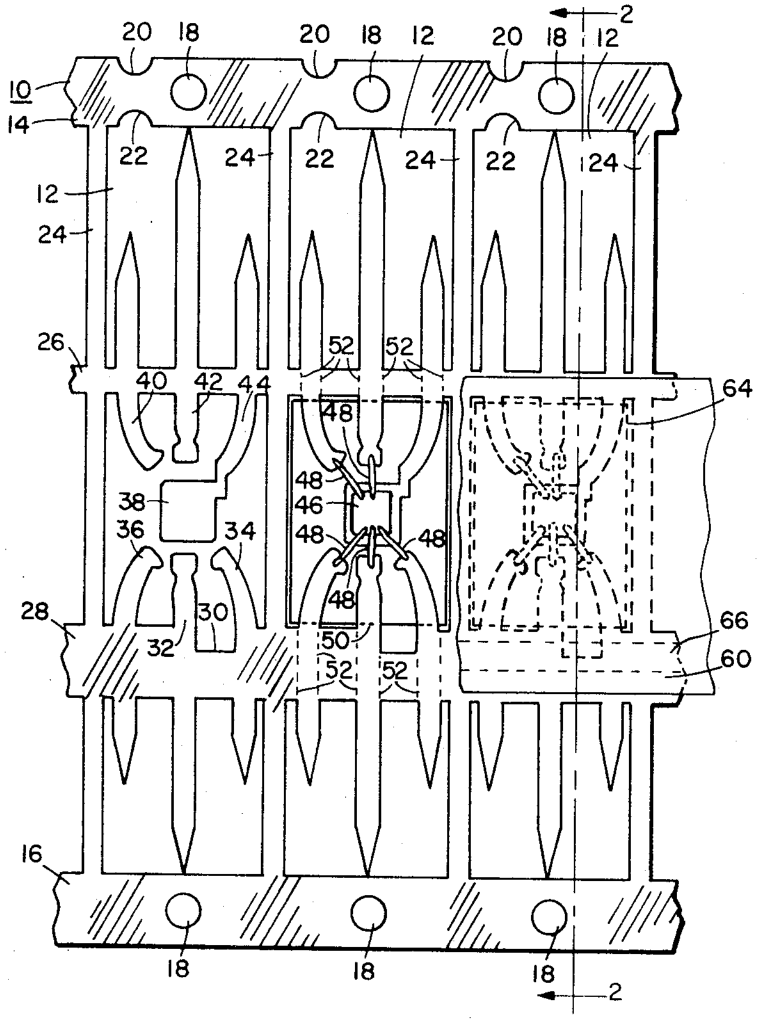

INVENTOR.
Thomas G. Bliven
John R. Hugill
BY
Mueller & Aichele
ATTY'S.

MOLDING MEANS FOR STRIP FRAME SEMICONDUCTIVE DEVICE

RELATED INVENTIONS

The invention of the present application is similar to those in the following patents assigned to applicant's assignee; U.S. Pat. No. 3,444,441, issued May 13, 1969; U.S. Pat. No. 3,413,713, issued Dec. 3, 1968; and U.S. Pat. No. 3,539,675, issued Nov. 10, 1970.

BACKGROUND

It is known to provide lead frames in strip form and to connect bonding pads on a chip on which a circuit has been deposited to inner ends of corresponding leads of the lead frame, and then to place the chip, the inner ends of the lead frame and the connections thereto into the molding cavity and to force fluid encapsulating material into the mold cavity, thereby filling the cavity and encapsulating the chip, the inner ends of the lead frame and the connections thereto. In doing this in accordance with the prior art, a gateway in the mold is provided for the cavity for the entry thereinto of fluid encapsulating material and the gateway is connected by a feed runner to a main runner. The main runner is connected to a reservoir into which the encapsulating material is placed and liquified by applying heat thereto and a piston is forced into the reservoir to force the fluid through the main runner, through the feed runners and through the gates into the several cavities formed in the mold. The provision of the feed runners and gates complicates the construction and maintenance of the mold. Furthermore, in the prior art the main runner runs alongside the strip frame and to one side thereof whereby the feed runners are quite long since each thereof runs about half-way across the lead frame from the main runner to the cavities. Each time a mold is used, the cavities thereof and the main and feed runners must be cleaned out, since a clogged runner will prevent the cavity from being filled with encapsulating fluid, resulting in a reduced yield of properly encapsulated semiconductor devices.

It is an object of this invention to provide a lead frame, which may be provided in the form of a strip of lead frames, which do not require feed runners or gates in the mold when the inner ends of the lead frames are encapsulated as part of an encapsulated semiconductor device.

It is another object of this invention to provide the combination of a lead strip and a mold requiring no feeder runners or gates in the mold.

SUMMARY

A lead frame is provided which is cut, stamped, etched or formed in any manner out of conductive material in which at least one of the support bars, which are integral with the leads near the inner ends thereof, is made relatively wide so that it can act as at least a portion of the floor of a main runner for encapsulating material. The wide support bar is so notched or formed along the length thereof so that the main leader communicates with the space around the chip and its connections that will be filled with encapsulating material whereby no feeder runner or gate is required.

DESCRIPTION

Figure 2:
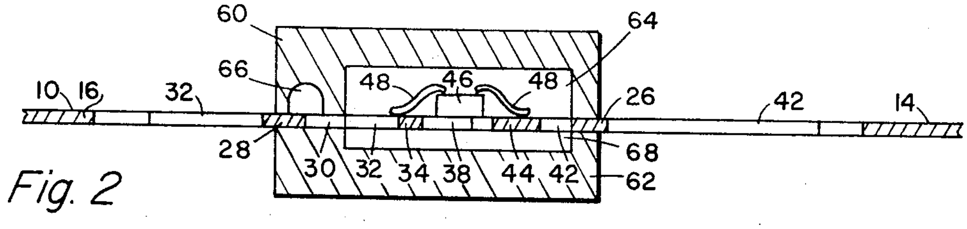
Figure 3:
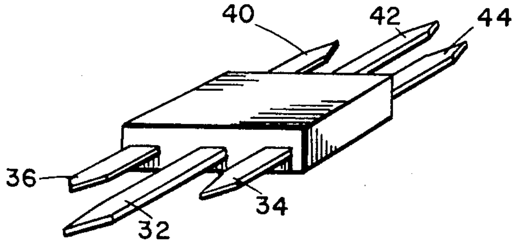

The invention will be better understood upon reading the following description in connection with the accompanying drawing in which FIG. 1 illustrates the lead frame and the mold of this invention in their cooperative position, FIG. 2 is a view of the device of FIG. 1 taken on the line 2 — 2 thereof, and FIG. 3 shows a completed encapsulated device made by use of the lead frame and mold of FIGS. 1 and 2.

A strip 10 of lead frames 12 is provided. While only three lead frames 12 are shown in strip form, there may be as many lead frames 12 as desired in the strip 10. The strip 10 may be made of any suitable conductive material, such as mild steel which is gold plated. While a frame having six leads, three of which come in in opposite directions from the other three, will be described, the frame may be provided with any number of leads and in whatever arrangement thereof that is convenient.

The strip 10 comprises two end bars 14 and 16 having indexing holes 18 along the length thereof. The end bar 14 may also be formed with external segmental notches 20 and internal segmental notches 22, which may also be used for indexing. Crossbars 24 are provided which run parallel to each other and perpendicularly to the end bars 14 and 16 and which include a lead frame 12 between them. The crossbars 24 are so spaced that their facing edges are separated by one dimension, the width dimension for example of the completed encapsulated semiconductor device of FIG. 3, as will be further explained. Each lead frame 12 includes two support bars 26 and 28. The bar 26 may be narrow and uniform in width and extend along the length of the strip 10, being integrally connected to the crossbars 24. The support bar 28 is quite wide and it also extends along the length of the strip 10 and is integral with the crossbars 24. The facing edges of the support bars 26 and 28 are separated by another dimension, the length dimension, for example, of the encapsulated semiconductor device of FIG. 3. However, the support bar 28 is not uniform in width in that a notch 30 is formed in the bar 28 along the length thereof between two crossbars 24 and facing the other support bar 26. As shown, the notch 30 is between the inner ends of the two leads 32 and 34 that extend towards the crossbar 26 from the crossbar 28. Also as shown, the inner end of another lead 36 also extends from the crossbar 28 towards the crossbar 26. The lead end 32 extends nearly perpendicular to the bar 28 and the lead ends 34 and 36 curve towards each other so that the ends of the leads 32, 34 and 36, which may be shaped in any convenient shape, are near a chip support pad 38. In many types of lead frames, no chip support pad need be provided. It will be understood that the notch 30 can take any shape or dimension or position as long as it performs its function of acting as a molding gate, as will be further explained, and as many notches 30 as is desirable may be used.

The ends of three other leads, 40, 42 and 44, extend from the inside edge of the support bar 26 towards the support bar 28. The lead 42 extends perpendicularly to the bar 26 while the leads 40 and 44 curve towards each other. The end of the lead 44 comprises the pad 38 for supporting the chip 46 of the semiconductor device. The ends of the leads 32, 34, 36, 40 and 42 are connected by connecting wires 48 to bonding pads on the chip 46. The chip itself is bonded to the support 38 whereby the lead 44 is connected to the chip 46. The inner part of the leads 32, 34, 36, 40, 42 and 44, the pad 38, the chip 46 and the connections 48, are all to be encapsulated by encapsulating material whose outline takes the shape of the rectangle 50 and whose shape may be seen in FIG. 3. Then, after encapsulation, the support bars 26 and 28 are cut along the edges of the leads 32, 34, 36, 40, 42 and 44 as for example on the dotted lines 52. In the molding step, the notch 30 acts as a gate for the entry of the encapsulating fluid into the mold cavity that contains the inner ends of the leads 32, 34, 36, 40, 42 and 44, the chip 46 and the corresponding connections 48, the support bar 28 acting as at least a portion of one wall of the main leader as is explained hereinafter.

The mold itself, see FIGS. 1 and 2, comprises an upper mold portion 60 and a lower mold portion 62. The upper mold portion runs lengthwise of the strip 10 and has as many cavities 64 and 68 as are convenient, one for each lead frame 12, the cavities 64 being large enough to include the chip 46, the connections 48 and the inner ends of the leads 32, 34, 36, 40, 42 and 44 up to the support strips 26 and 28 in one direction and up to the adjacent crossbars 24 in the other direction. The upper mold also includes a main runner 66 which runs the length thereof. The main runner 66 is so positioned with respect to the bar 28 that the bar 28 closes off at least a portion of the bottom of the runner 66 and the notches 30 act as gates for the several cavities 64 whereby encapsulating fluid forced down the runner 66 gets into the cavities 64 and 68 by way of the notches 30. The bottom part of the mold 62 has a cooperating cavity 68 that registers with the cavity 64. Due to the contacting of the mold portions 60 and 62 on the upper and lower surfaces of the bars 24, 26 and 24 and 28, the encapsulating fluid is retained therebetween. After the fluid has hardened in the closed mold, the mold portions 60 and 62 are removed, the end bars 14 and 16 are cut away. The bars 26 and 28 are cut through between the several leads as on the lines 52 and the completed encapsulated semiconductor device of FIG. 3 results. The scale of the drawing is very large. Actually, the distance between the extreme ends of the leads 32 and 34 may be about an inch, in one practical semiconductor device, and the other dimensions may be proportional thereto.

It is clear that two or more notches such as notch 30 may be formed along the length of the bar 28 and between the leads 32, 34 and 36 or between the leads 34 and 36 and the adjacent crossbar 24. Or, if no leads extend into the space between the bars 28 and 26 from the bar 28, the notch 30 may be made any size up to the width of the completed device of FIG. 3, that is, the notch may extend any part or all of the distance between the adjacent crossbars 26.

The above description is of one embodiment of this invention and this invention is not to be limited by the shape of the lead frame or of the chip or of the connection of the chip to the conductors comprising the lead frame but is limited only by the appended claims.

We claim:

1. An apparatus facilitating the plastic encapsulation of electrical devices including in combination:

lead frame means having first and second supporting bars running generally parallel to each other, and a plurality of cross bars running generally perpendicular to and having portions integral with said first and second supporting bars;

a plurality of frame segments adjacent one another over the length of said lead frame means with each frame segment corresponding to an electrical device and with each frame segment defined by at least two portions of said first and second supporting bars and two portions of said cross bars which enclose an area in said frame segment;

lead means integral with said supporting bars and extending into said area and adapted for connection with an electric means to be mounted in said area for electrical devices;

one of said portions of said supporting bar portion having a predetermined opening therein which opens into said enclosed area;

first mold means having a plurality of cavities positioned therein and corresponding to said frame segments of said lead frame means, each of said cavities having an enclosing wall with an exposed surface, said supporting and cross bar portions of each frame segment engaging said exposed surface of each wall when in molding position on said first mold means;

second mold means superimposed on said first mold means and having a plurality of cavities therein corresponding to said cavities of said first mold means with each cavity of said second mold means being defined by a wall corresponding to the wall in a corresponding cavity of said first mold means, each of said walls of said second mold means having an exposed surface for engagement with one side of said supporting bar and cross bar portions of said lead frame means, with the opposite side of said portions of said lead frame means engaging said exposed surface of said corresponding wall of said first mold means;

with one of said two mold means having a channel therein extending longitudinally to said mold means and adjacent to but spaced from and not connected with any of said plurality of cavities in said one mold means, said channel having an open face;

said channel being closed at said open face thereof by engagement with a supporting bar except at a predetermined opening to provide a passage from said channel into said cavity through said predetermined opening for the flow of liquid encapsulating material through said channel and through said opening to encapsulate that within the cavity; and said opening, said first mold means, said second mold means and said supporting bar portion between the two mold means thereby cooperating to form said passage between said channel and said cavity, said passage controlling the flow of encapsulating material from said channel into said cavity.

2. The apparatus of claim 1 wherein:

said predetermined opening is located in said supporting bar covering said channel and between two of said lead means.

3. The apparatus of claim 1 further including:

third and fourth supporting bars running substantially parallel to said first and second supporting bars;

said cross bars extending generally perpendicular to said first and second supporting bars to respectively join said third and fourth supporting bars; and said lead means having portions extending from said first supporting bar toward said third supporting bar and from said second supporting bar toward said fourth supporting bar.

4. A molding system for encapsulating a device comprising a lead frame of conductive material which includes a support bar and leads extending from the support bar so that the inward ends of leads are adjacent each other, an electrical unit mounted in the lead frame and conductively connected to leads, first and second mold portions for a mold having registering cavity portions to receive the inner ends of said leads and the electrical unit in a mold cavity formed by said cavity portions, a runner groove extending in said first mold portion, and positioned to extend along said mold and spaced from said mold cavity and registering at least in part with said support bar when said mold portions are properly positioned with respect to said lead frame for encapsulating the inner ends of said leads and said electrical unit and said conductive connections, said runner groove extending along said support bar, said support bar being so formed that said runner groove communicates with said mold cavity through a space in the formation of said support bar, the width of said support bar with which said runner groove registers being at least as great as the width of said runner groove for at least a portion of the length of said support bar, and said registering support bar is so narrowed in a portion at the space in the formation thereof as to cause communication between said runner groove and said mold cavity by way of said narrowed portion of said support bar.

5. In a molding system as defined in claim 4 wherein the support bar is narrowed in a plurality of portions, and plastic fluid passes along the runner groove in the mold portion and into the mold cavity through each of the plurality of narrowed portions of the support bar.

6. A molding system for plastic encapsulating an electrical device including the combination of a mold having runner means therein and a one-piece lead frame with which to assemble the electrical device to be encapsulated, wherein gate means is provided in the lead frame cooperating with runner means in the mold, said system including a one-piece lead frame which has therewith a plurality of leads, a support bar integral with leads, and cross bar means positioned outside the leads integral with the support bar and extending transversely to said support bar in the lead frame, an electrical unit mounted in the lead frame and conductively connected to each lead, first and second mold portions for the mold in said system, and a cavity portion in each said mold portion oppositely positioned to one another with the cavity portions together providing a mold cavity for the reception of fluid plastic to encapsulate a portion of each lead and the electrical unit conductively connected to said leads, with said runner means being in one of said mold portions adjacent the cavity for passage in the mold of encapsulating fluid plastic, and said gate means in the lead frame in said system comprising at least one notch in said support bar, said notched support bar, when the lead frame is in the mold, extending longitudinally of said runner means and covering the same except at said notch, and with said notch serving as a gate means for permitting passage of encapsulating fluid plastic from said runner means through said notch directly into said mold cavity to encapsulate the portion of each lead and the electrical unit and conductive connections therefrom in said mold cavity, said gate means comprising the only outlet from said runner means to said mold cavity for the flow of encapsulating fluid plastic into said mold cavity, and with said support bar and said cross bar means being severable from said lead frame after said encapsulation is accomplished.

7. In the molding system of claim 6 wherein said lead frame has two support bars for support of said plurality of leads, with one of said support bars being wider than the other and said wider support bar having said notch therein to serve as a gate means.

8. In the molding system of claim 6 wherein said lead frame is one of a plurality of frames in an elongated metal strip and said mold has a plurality of mold cavities, runner means extending the length of the mold, and with the gate means in each frame cooperating with said runner means.

9. A molding system as defined in claim 6 wherein said plurality of leads is in two groups extending in opposite directions from one another, a pair of support bars spaced from one another and positioned generally parallel to one another, with each support bar integral with a corresponding one of said two groups of leads, said cross bar means comprising a pair of cross bars connecting the pair of support bars and extending transversely with respect to said support bars, with one of said support bars being notched to serve as said gate means for the flow of encapsulating fluid plastic into said mold cavity.

* * * * *